(12) United States Patent
Lo et al.

(10) Patent No.: US 7,619,380 B2
(45) Date of Patent: Nov. 17, 2009

(54) METHOD AND APPARATUS FOR CONTROLLING ROTATIONAL SPEED OF FAN

(75) Inventors: Chien-Hung Lo, Taipei Hsien (TW); Xiang Cao, Shenzhen (CN); Yong-Qian Deng, Shenzhen (CN); Zhi-Hua Pan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/963,861

(22) Filed: Dec. 24, 2007

(65) Prior Publication Data

US 2008/0253751 A1  Oct. 16, 2008

(30) Foreign Application Priority Data

Apr. 12, 2007  (CN)  .................... 2007 1 0200442

(51) Int. Cl.
H02P 1/00 (2006.01)
(52) U.S. Cl. .................... 318/268; 318/434; 318/471
(58) Field of Classification Search ............. 318/268, 318/434, 471, 459; 388/934, 908, 903, 804
See application file for complete search history.

(56) References Cited

U.S. PATENT DOCUMENTS

| 6,380,704 | B1 | 4/2002 | Chin | |
|---|---|---|---|---|
| 2005/0236571 | A1* | 10/2005 | Suzumura | ................ 250/338.1 |
| 2005/0244263 | A1* | 11/2005 | Hardt et al. | ................... 415/47 |

FOREIGN PATENT DOCUMENTS

| CN | 2454987 Y | 10/2001 |
|---|---|---|
| CN | 2876852 Y | 3/2007 |

* cited by examiner

*Primary Examiner*—Karen Masih
(74) *Attorney, Agent, or Firm*—Zhigang Ma

(57) ABSTRACT

An apparatus for controlling rotational speed of a fan includes a sensor module, a single chip microcomputer (SCM) module, and a driving module. The sensor module collects rotational speed signals of a fan, and converts the rotational speed signals to voltage signals. The SCM module receives the voltage signals from the sensor module and compares the voltage signals with a predetermined rotational speed value stored in the SCM module, and outputs a control signal according to the comparison. The driving module receives the control signal from the SCM module, and outputs a pulse width modulation (PWM) signal to control the rotational speed of the fan.

9 Claims, 2 Drawing Sheets

METHOD AND APPARATUS FOR CONTROLLING ROTATIONAL SPEED OF FAN

BACKGROUND

1. Field of the Invention

The present invention relates to a method and an apparatus for controlling rotational speed of a fan with high precision.

2. Description of Related Art

In typical electronic product such as a computer, electronic components therein generate a lot of heat during operation. If the electronic components are continuously operated at high temperatures, they are easily damaged. Thus, to prevent such damage, a heat-dissipating fan is disposed in the electronic product to dissipate heat. And, the higher the rotational speed of the fan, the more heat dissipated. A conventional method to control the rotational speed of a fan is using the Basic Input Output System (BIOS). The BIOS controls the rotational speed via software, but the controlling precision is not high.

What is needed, therefore, is to provide a method and an apparatus for precisely controlling rotational speed of a fan.

SUMMARY

An exemplary apparatus for controlling rotational speed of a fan includes a sensor module, a single chip microcomputer (SCM) module, and a driving module. The sensor module collects rotational speed signals of a fan, and converts the rotational speed signals to voltage signals. The SCM module receives the voltage signals from the sensor module and compares the voltage signals with a predetermined rotational speed value stored in the SCM module, and outputs a control signal according to the comparison. The driving module receives the control signal from the SCM module, and outputs a pulse width modulation (PWM) signal to control the rotational speed of the fan.

Other advantages and novel features of the present invention will become more apparent from the following detailed description of preferred embodiment when taken in conjunction with the accompanying drawings, in which:

DETAILED DESCRIPTION

Figure 1:
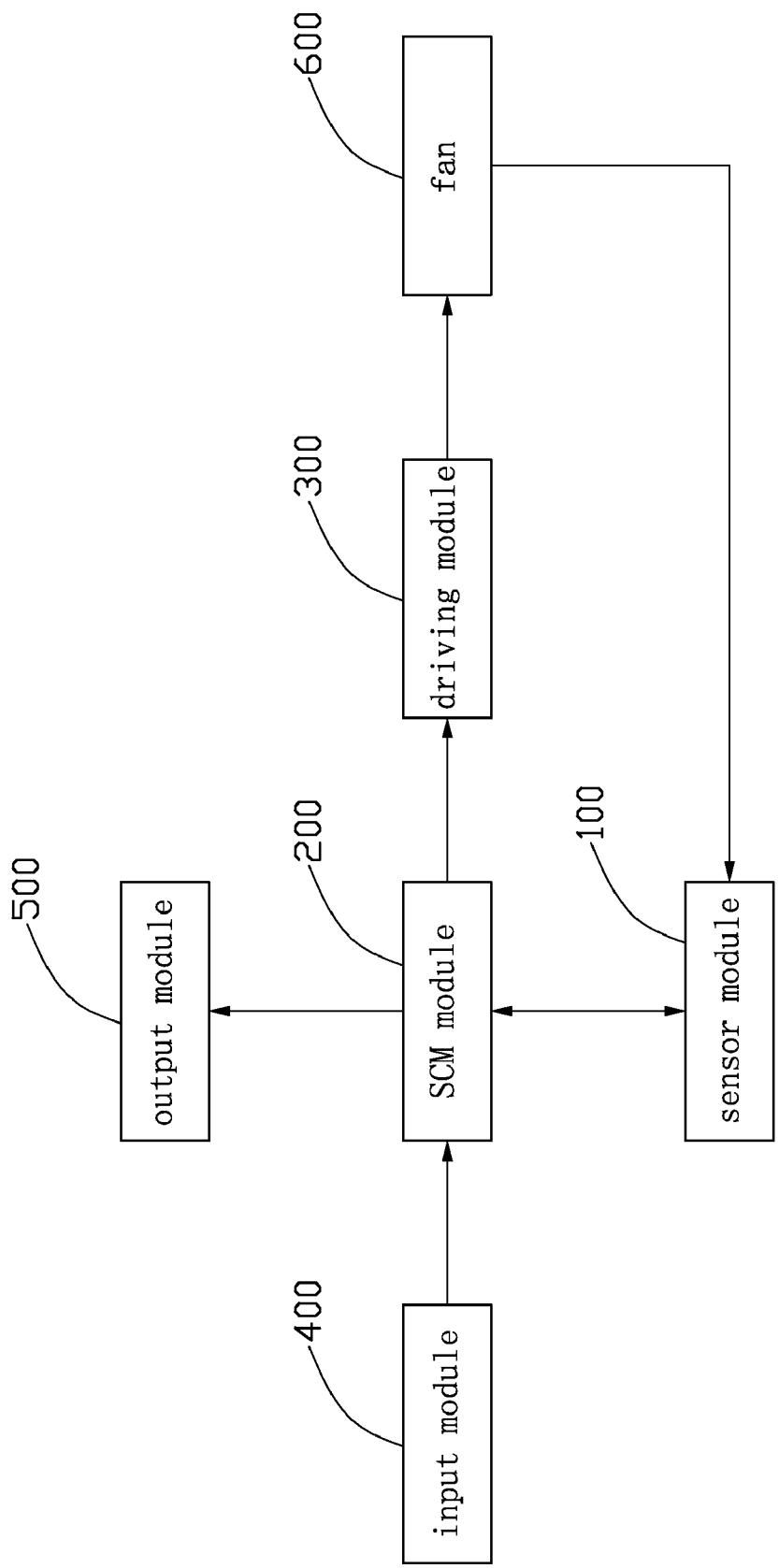
FIG. 1 is a block diagram of an embodiment of an apparatus for controlling rotational speed of a fan in accordance with the present invention.

Referring to FIG. 1, an apparatus for controlling rotational speed of a fan in accordance with an embodiment of the present invention includes a sensor module 100, a single chip microcomputer (SCM) module 200, a driving module 300, an input module 400, and an output module 500. The sensor module 100 collects rotational speed signals of a fan 600, and converts the rotational speed signals to voltage signals. The SCM module 200 receives the voltage signals from the sensor module 100 and compares the voltage signals with a predetermined rotational speed value stored in the SCM module 200, and outputs a control signal according to the comparison. The driving module 300 receives the control signal from the SCM module 200, and outputs a pulse width modulation (PWM) signal to control the rotational speed of the fan 600. The input module 400 is used to set the predetermined rotational speed value in the SCM module 200. The output module 500 is used to display the rotational speed value corresponding to the voltage signal received at the SCM module 200.

Figure 2:
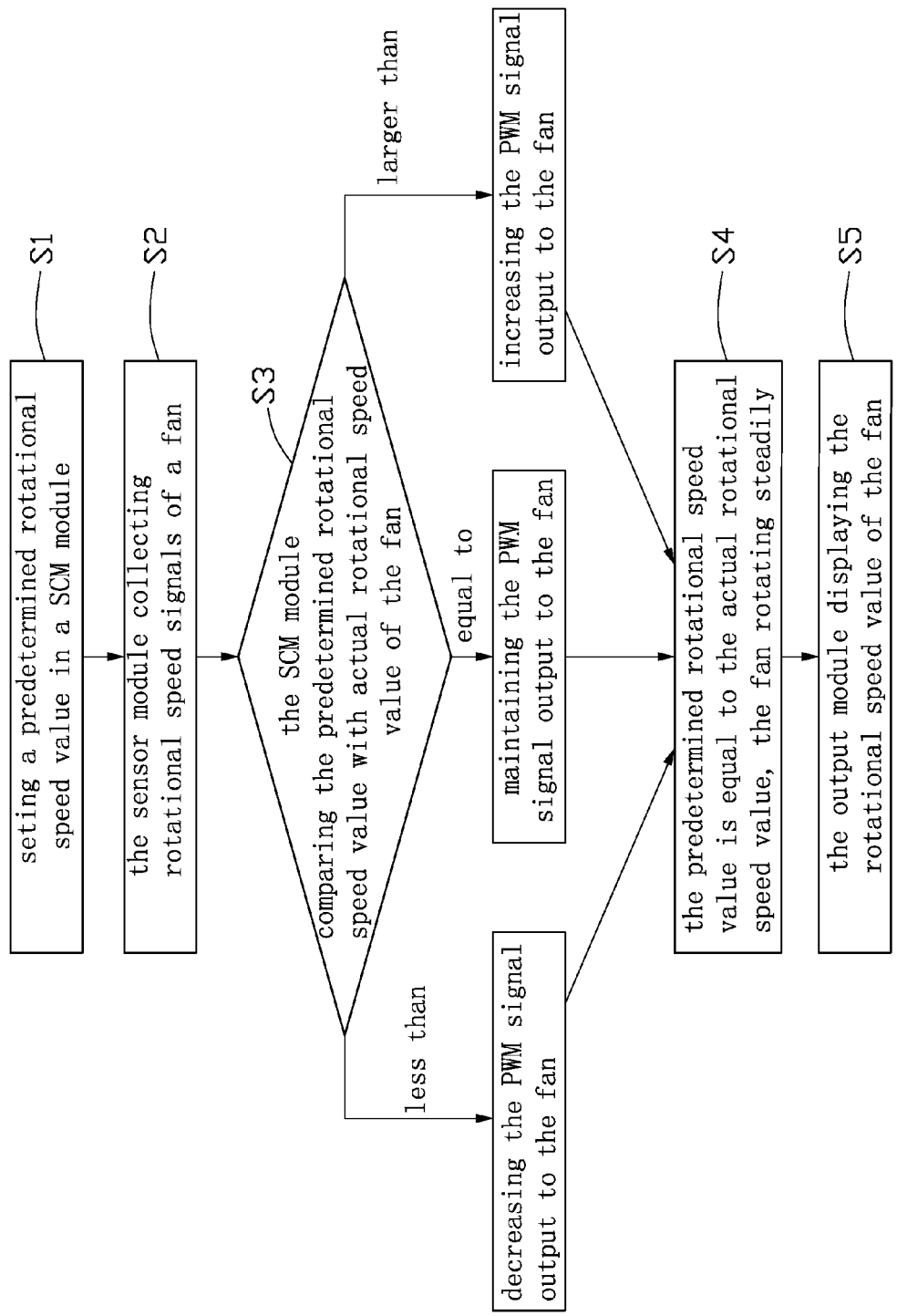
FIG. 2 is a flow chart of a method for controlling rotational speed of the fan using the apparatus of FIG. 1.

Referring to FIG. 2, a method for controlling rotational speed of the fan 600 using the apparatus of FIG. 1 includes the following steps:

Step S1: setting a predetermined rotational speed value in the SCM module 200 through the input module 400.

Step S2: the sensor module 100 collecting rotational speed signals of the fan 600.

Step S3: the SCM module 200 comparing the predetermined rotational speed value with actual rotational speed value of the fan 600. If the predetermined rotational speed value is greater than the actual rotational speed value, the SCM module 200 controls the driving module 300 to increase the PWM signal output to the fan 600. If the predetermined rotational speed value is less than the actual rotational speed value, the SCM module 200 controls the driving module 300 to decrease the PWM signal output to the fan 600. If the predetermined rotational speed value is equal to the actual rotational speed value, the SCM module 200 controls the driving module 300 to maintain the PWM signal output to the fan 600.

Step S4: when the actual rotational speed value is equal to predetermined rotational speed value, the driving module 300 outputs a steady PWM signal to the fan 600, so that the fan 600 rotates steadily with the predetermined rotational speed value.

Step S5: the output module 500 displaying the rotational speed value of the fan 600.

In this embodiment, the input module is a keyboard, the output module is a display. The method and apparatus for controlling rotational speed of the fan uses the sensor module, the SCM module, and the driving module, thereby controlling the rotational speed of the fan conveniently with high precision.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An apparatus for controlling rotational speed of a fan, comprising:

a sensor module configured for collecting rotational speed signals of the fan, and converting the rotational speed signals to voltage signals;

a single chip microcomputer (SCM) module configured for receiving the voltage signals from the sensor module and comparing the voltage signals with a predetermined rotational speed value stored in the SCM module, and outputting a control signal according to the comparison; and a driving module configured for receiving the control signal from the SCM module, and outputting a pulse width modulation (PWM) signal to control the rotational speed of the fan.

2. The apparatus as claimed in claim 1, further comprising an input module for setting the predetermined rotational speed value in the SCM module.

3. The apparatus as claimed in claim 1, further comprising an output module for displaying the rotational speed value corresponding to the voltage signal received by the SCM module.

4. A method for testing rotational speed of a fan, comprising the following steps:
    collecting rotational speed signals of the fan through a sensor module;
        the sensor module converting the rotational speed signals to voltage signals, and transmitting the voltage signals to a single chip microcomputer (SCM) module which stores a predetermined rotational speed value;
        the SCM module comparing the voltage signal with the predetermined rotational speed value; and
    the SCM module outputting a control signal to a driving module according to the comparison, the driving module adjusting the pulse width modulation (PWM) signal output to the fan according to the control signal, when the actual rotational speed value is equal to the predetermined rotational speed value, the driving module outputs a steady PWM signal.

5. The method as claimed in claim 4, the driving module increases the PWM signal output to the fan when the predetermined rotational speed value is greater than the actual rotational speed value.

6. The method as claimed in claim 5, the driving module decreases the PWM signal output to the fan when the predetermined rotational speed value is less than the actual rotational speed value.

7. The method as claimed in claim 6, the driving module maintains the PWM signal output to the fan when the predetermined rotational speed value is equal to the actual rotational speed value.

8. The method as claimed in claim 4, further comprising a step: setting the predetermined rotational speed value in the SCM module through an input module.

9. The method as claimed in claim 4, further comprising a step: displaying the rotational speed value corresponding to the voltage signal on an output module.

* * * * *